United States Patent [19]

Turner

[11] 4,138,235
[45] Feb. 6, 1979

[54] METHOD OF MAKING FLAT GLASS WITH LOWER SULFUR-CONTAINING EMISSIONS

[75] Inventor: Warren H. Turner, Spring Church, Pa.

[73] Assignee: PPG Industries, Inc., Pittsburgh, Pa.

[21] Appl. No.: 801,672

[22] Filed: May 31, 1977

[51] Int. Cl.$^2$ .......................... C03B 3/00; C03C 3/00
[52] U.S. Cl. ............................................. 65/27; 65/134
[58] Field of Search .................. 65/27, 134, 135, 136; 106/DIG. 8

[56] References Cited

U.S. PATENT DOCUMENTS

| | | | |
|---|---|---|---|
| Re. 25,312 | 1/1963 | Duncan et al. | 106/52 |
| Re. 26,328 | 1/1968 | Monks | 106/52 |
| 3,238,030 | 3/1966 | O'Connell et al. | 65/27 |
| 3,240,581 | 3/1966 | O'Connell et al. | 65/27 |
| 3,296,004 | 1/1967 | Duncan | 106/52 |
| 3,375,095 | 3/1968 | Poole | 65/134 |
| 3,511,629 | 9/1977 | Bauer et al. | 65/134 |
| 3,542,534 | 11/1970 | Yamamoto | 65/27 |
| 3,589,885 | 6/1971 | Monks | 65/134 |
| 3,615,767 | 10/1971 | Conroy et al. | 65/134 |
| 3,725,022 | 4/1973 | Mills | 65/27 |
| 3,788,832 | 1/1974 | Nesbitt et al. | 65/27 X |
| 3,833,388 | 9/1974 | Ohlberg et al. | 106/52 |
| 3,846,143 | 11/1974 | Mod et al. | 106/52 |
| 3,880,639 | 4/1975 | Bodner et al. | 65/134 |
| 3,969,100 | 7/1976 | Kuna et al. | 65/27 |

OTHER PUBLICATIONS

Handbook of Glass Manufacture, p. 66, by F. V. Tooley, Ogden Publishing Co., New York, 1953.
Ceramic Bulletin, vol. 54, No. 6, 1975, pp. 262–264.
Ceramic Industry, Feb. 1972, p. 31.
Business Week, Mar. 31, 1976, pp. 66b–66h.

*Primary Examiner*—Arthur D. Kellogg
*Attorney, Agent, or Firm*—Dennis G. Millman

[57] ABSTRACT

Conventional flat glass compositions are melted in a continuous melting process with lowered sulfur-containing emissions and with improved fining at high batch-to-cullet ratios by controlling the amount of $SO_3$ included in the batch materials and cullet. This is accomplished while maintaining high throughputs and without using substitute fining agents. Preferably, the amount of carbon in the batch is maintained at a minimal level or eliminated.

12 Claims, No Drawings

METHOD OF MAKING FLAT GLASS WITH LOWER SULFUR-CONTAINING EMISSIONS

BACKGROUND OF THE INVENTION

The present invention relates to the reduction of sulfur-containing emissions (e.g., $SO_2$ and $SO_3$ gases, particulate sulfates, and $H_2SO_4$ mist) from a large scale, continuous, flat glass melting operation. The term flat glass refers to glass commercially produced by the float process, plate rolling and grinding, and sheet drawing. Flat glass generally conforms to a relatively narrow composition range as follows:

$SiO_2$: 69–75% by weight
$Na_2O$: 12–16% by weight
$K_2O$: 0–2% by weight
$CaO$: 8–12% be weight
$MgO$: 2–5% by weight
$Al_2O_3$: 0–2% by weight
$SO_3$: 0.15–0.5% by weight
$Fe_2O_3$: 0–0.7% by weight Commercial production of flat glass conventionally involves feeding raw glass batch materials into an opening at one end of an elongated melting furnace while withdrawing melted glass through an opening at the opposite end of the furnace and forming it into a continuous flat ribbon. Flat glass batches typically include sand (silica), soda ash (sodium carbonate), limestone (calcium carbonate), dolomite (calcium carbonate and magnesium carbonate), rouge (iron oxide), a source of sulfate such as salt cake, gypsum, etc., and sometimes the raw materials aplite, feldspar, or nepheline syenite. It is also known to use caustic soda in place of soda ash. Minor amounts of additional materials such as colorants may sometimes be used as well. These batch ingredients, in finely divided, dry, particulate form, are blended together and usually wetted with water prior to being introduced into the furnace. Additionally, a substantial amount of cullet (crushed glass) is mixed with the batch ingredients, in amounts usually ranging from about 20% to about 60% of the total glassmaking materials being fed to the furnace.

When introduced to the high temperature conditions within the melting furnace, the raw ingredients undergo chemical reactions and dissolution which, in a continuous flat glass furnace, normally take place within the first half of the furnace or less. The remainder of the furnace is devoted to "fining" (or "refining") and conditioning the glass melt. The process of fining is the removal of gaseous products of reaction from the melt by providing conditions which cause the gas bubbles to rise to the surface and burst or to redissolve in the glass. In a continuous glassmaking operation it is very important that conditions be maintained to enable fining of each portion of the melt to take place within its limited residence time in the fining zone of the furnace. Any gaseous inclusions which are carried out in the product stream form the defects known as "bubbles" (those having diameters larger than 0.25 mm.) or "seeds" (those having diameters smaller than 0.25 mm.) in the glass.

The problem of obtaining adequate fining is especially acute in a flat glassmaking operation since the standards for bubbles and seeds for flat glass are much more stringent than other types of glass such as bottle glass. For example, flat glass having one seed per square foot (0.09 square meter) would be considered rejectable for most flat glass applications, whereas what would be regarded as a very good grade of bottle glass may have on the order of 500 seeds per square foot (0.09 square meter) if formed into a sheet of the same thickness. In order to obtain adequate fining within a reasonable length of furnace, the flat glass industry has heretofore relied on the inclusion of large amounts of salt cake (sodium sulfate) and coal (carbon) in the batch as fining agents. The salt cake reacts to form substantial volumes of gaseous products which accelerate the movement of bubbles and seeds to the surface of the melt and help to homogenize the glass. Thus, it has long been the standard practice in the commercial production of flat glass to include substantial amounts of salt cake and coal in the batch ingredients fed to continuous melting furnaces. The customary use of salt cake and coal has also been based on other widely-held beliefs in the glassmaking art, such as the necessity for preventing "silica scum" (see "Handbook of Glass Maufacture," p. 66, F. V. Tooley, Ogden Publishing Co., N. Y., 1953) and for aiding the dissolution of sand grains (see Ceramic Bulletin, Vol. 54, No. 6 (1975), pp. 262–4).

Unfortunately, the use of salt cake as a fining agent has serious drawbacks. At glass melting temperatures salt cake dissociates or volatilizes, resulting in the emission of sulfur-containing gases. These may recombine with water vapor or sodium vapor within the furnace to form sulfuric acid mist or particulate sodium sulfate, which are not only air pollutants, but have a detrimental effect on the checker-packing in the regenerators of the furnace. Many widely varying proposals for reducing sulfur-containing emissions, have been made in the prior art, but none is entirely satisfactory.

One commonly proposed solution is to treat the effluent gas stream to remove the sulfur compounds. However, such an approach is costly and does not reduce the detrimental effects of the emissions on the regenerators. U.S. Pat. Nos. 3,788,832 and 3,880,639 disclose examples of the recovery and recycling of sulfur compounds from the exhaust gas stream by contacting the exhaust gas with incoming batch materials.

Elimination of salt cake is proposed in U.S. Pat. No. 3,846,143 by using in place thereof the reaction product of an alkali hydroxide and a source of alumina. It would be preferred that such an added pre-treatment step be avoided. Moreover, alkali hydroxides are generally a more costly batch material than salt cake and the seed counts reported in the patent appear to be much higher than permitted for flat glass. Substitution of $SO_2$ gas for some or all of the salt cake as a source of sulfate is taught in U.S. Pat. No. 3,375,095 for the purpose of reducing deposition of sodium sulfate in the regenerators, but apparently without alleviating overall sulfur-containing emissions. Also, the use of $SO_2$ gas as a sulfate source would usually be more costly.

Many other materials have been suggested for use as fining agents in addition to or as a substitute for salt cake, but without addressing the problem of sulfur emissions. In U.S. Pat. No. Re. 26,328 the use of calcium fluoride, gypsum, and slag are suggested as fining agents in a bottle glass operation. But gypsum and slag are both sulfur-containing, and the fluoride content of calcium fluoride can also be an air pollution problem. U.S. Pat. No. 3,589,885 discloses the use of carbonaceous material impregnated with a sulfate as a fining agent along with calcium fluoride for making bottle glass. U.S. Pat. No. 3,615,767 teaches the use of sodium sulfite as a fining agent. In U.S. Pat. No. 3,511,629 a frit containing sodium or barium sulfide is used as a fining agent. An article in "Ceramic Industry," Feb. 1972, page 31, suggests the use of elemental sulfur or slag in addition to salt cake as fining agents. The use of slag is also suggested in U.S. Pat. No. 3,725,022. None of these alternate fining agents is purported to alleviate sulfur-containing emissions problems, and for the most part appear to be merely substituting one source of sulfate for another in the batch.

It has also been previously suggested that pelletizing the batch as taught in U.S. Pat. Nos. 3,542,534 and 3,969,100 and the abovementioned U.S. Pat. No. 3,880,639, while intended primarily to ease melting, may have as a secondary advantage a lower salt cake requirement. The substantial capital investment and increased operating costs entailed by a pelletizing operation, however, make such an approach impractical in many cases. Moreover, since the presence of salt cake in these patents is said to be as a melting aid, and not as a fining agent, it is unclear what effect the reduction of salt cake would have on defect levels in a large scale, continuous, flat glass melting furnace employing pelletizing.

In U.S. Pat. No. 3,833,388 there is disclosed a glass composition differing from that of conventional flat glass, and which is said to require less salt cake, with a resulting reduction in sulfur-containing emissions. But because such a glass has properties which are slightly different from those of conventional flat glass, which properties are important in subsequent processing such as tempering, its use is preferably avoided.

Reduced amounts of salt cake are employed in the manufacture of one type of flat glass: colored glasses which incorporate selenium, cobalt, and nickel oxides, such as those disclosed in U.S. Pat. Nos. 3,296,004 and Re. 25,312. In glasses of this particular type, development of the desired coloration requires that oxidizing conditions be maintained and, therefore, salt cake and coal are minimized and alternate fining agents which act as oxidizing agents are employed, such as sodium nitrate or sodium chloride. The present invention, on the other hand, deals only with glasses which may be categorized as clear, or which contain iron oxide as the essential colorant. Since the refining agents used in the melting of the selenium, cobalt, and nickel colored glasses are more costly, and since the high oxidizing conditions are not required for conventional clear and iron tinted glass, the use of such alternate fining agents is preferably avoided when possible. Other alternate fining agents which are known in the art, but which are also preferably avoided, are arsenic oxide, antimony oxide, cerium oxide, and manganese oxide.

Other ways of reducing sulfur-containing emissions may be apparent to those of skill in the art, but each has serious drawbacks. For example, volatilization of salt cake may be reduced by lowering the melting furnace temperature, but the output of the furnace would be reduced and completeness of melting may suffer. Another possibility would be to reduce the amount of salt cake employed and compensate by increasing furnace temperatures. But the result would be shorter furnace life and greater fuel consumption. Yet another approach would be to increase the relative amount of cullet charged to the furnace along with the batch materials. This latter approach has been considered by some in the glass industry to be best solution to the emissions problem as evidenced by Business Week, Mar. 31, 1976, pp. 66B, 66H. But reliance on large amounts of cullet is preferably avoided because adequate supplies of suitable cullet are not always available in the flat glass industry, and excessive use of cullet represents inefficient utilization of a flat glass melting furnace in that more fuel is consumed to yield a net amount of glass. Thus, it would be desirable if sulfur-containing emissions could be reduced without altering the usual temperature conditions in a melting furnace, while at the same time using a high batch-to-cullet ratio.

SUMMARY OF THE INVENTION

The present invention relates to a method of operating a continuous flat glass melting furnace so as to reduce sulfur-containing emissions. This is achieved by the present invention without sacrificing glass quality and without the use of substitute fining agents, and yet permits the use of high batch-to-cullet ratios while operating at normal furnace temperatures and throughputs.

It has been discovered that a relatively small, specifically defined amount of salt cake employed in the batch results in reduced emissions without sacrificing glass quality. More specifically, it has been found that the sulfur content of the batch (expressed as $SO_3$) which includes both the salt cake in the batch as well as $SO_3$ in the cullet, should be less than about 2.25 (preferably less than 2.0) times the amount of $SO_3$ retained in the final glass product. In other words, for a given tonage of throughput, an optimum amount of salt cake has been found which is independent of the batch-to-cullet ratio. This is contrary to the prior art belief that inclusion of salt cake in an amount proportional to the sand in the batch was necessary. It has been found that this prior art practice of maintaining a fixed amount of salt cake for a given amount of sand in the batch can lead to excessive sulfur-containing emissions and to the production of excess foam on the surface of the melt and associated defects, particularly at high batch-to-cullet ratios, such as 70 parts by weight batch to 30 parts by weight cullet or higher. But by utilizing a batch with a total $SO_3$ content of no more than about 2.25 times that of the outgoing glass stream, it has been found that batch-to-cullet ratios higher than 70/30 may be used with reduced sulfurous emissions, while at the same time maintaining the usual low defect densities of flat glass.

It has additionally been discovered that even greater improvements can be obtained if the conventional inclusion of coal in the glass batch is reduced or essentially eliminated. Coal has long been considered an essential ingredient in the glass batch for the purpose of aiding melting. It was believed that the coal serves to break down salt cake into sodium oxide and sulfur dioxide, and that the sodium oxide then serves to dissolve sand grains. It has now been found, however, that such a reaction results in premature volatilization of the sulfur dioxide, with the result that less of the salt cake is available for fining at the subsequent fining stage of the continuous melting process and that excess foam is produced on the surface of the melt, particularly at high batch-to-cullet ratios. By eliminating coal, the salt cake is not so rapidly broken down, so that a greater portion of the salt cake may be retained in the glass melt so as to act as a fining agent in the fining zone of the melting furnace. While the fining ability of a given amount of salt cake is thus enhanced, it has been found quite suprisingly that no difficulty in melting sand grains and producing homogeneity is caused thereby in a flat glass melting operation. As a result, considerable less salt cake is needed to produce glass of a given quality and the amount of sulphurous emissions is reduced. Additionally, even though less salt cake is used, it has been found that fining is improved and that the final glass composition includes slightly more $SO_3$ than with previous practice. Also, the amount of foam in the furnace is reduced.

DETAILED DESCRIPTION

The invention will be illustrated herein by a number of specific examples of preferred embodiments, and these examples all relate to a large-scale, commercial glassmaking operation employing the float process, with an output of about 400 to 550 tons (360 to 500 metric tons) per day of flat glass. The glasses produced in the examples have the following average compositions, with only very minor variations:

|  | Tinted | Standard Clear |
|---|---|---|
| $SiO_2$ | 72.80 | 73.10 |
| $Na_2O$ | 13.63 | 13.66 |
| $K_2O$ | 0.02 | 0.02 |
| $CaO$ | 8.80 | 8.85 |
| $MgO$ | 3.85 | 3.90 |
| $Al_2O_3$ | 0.10 | 0.10 |
| $SO_3$ | 0.25 | 0.25 |
| $Fe_2O_3$ | 0.55 | 0.12 |

TABLE I

|  | Example 1* | Example 2 | Example 3 | Example 4 | Example 5 |
|---|---|---|---|---|---|
| Batch formula: |  |  |  |  |  |
| Sand, kg. | 1000.0 | 1000.0 | 1000.0 | 1000.0 | 1000.0 |
| Soda ash, kg. | 298.4 | 311.75 | 315.96 | 313.7 | 316.26 |
| Limestone, kg. | 84.0 | 84.0 | 84.0 | 84.0 | 84.0 |
| Dolomite, kg. | 242.0 | 242.0 | 242.0 | 242.0 | 242.0 |
| Salt cake, kg. | 35.0 | 17.0 | 11.5 | 14.3 | 11.1 |
| Coal, kg. | 0.861 | 0 | 0 | 0 | 0 |
| Rouge, kg. | 0 | 9.04 | 10.2 | 7.75 | 0 |
| Cullet, kg. | 553.0 | 554.8 | 708.5 | 184.6 | 0 |
| Batch/cullet ratio | 75/25 | 75/25 | 70/30 | 90/10 | 100/0 |
| $SO_3$ in batch + cullet, kg./2000 kg. glass | 21.78 | 11.3 | 7.9 | 10.87 | 9.05 |
| $SO_3$ retained in glass, kg./2000 kg. glass | 5.0 | 5.0 | 5.0 | 5.0 | 5.0 |
| $SO_3$ lost, kg./2000 kg. glass | 16.78 | 6.3 | 2.9 | 5.9 | 4.05 |
| $SO_3$ added/$SO_3$ retained ratio | 4.35 | 2.26 | 1.58 | 1.85 | 2.23 |
| Glass type | Clear | Tinted | Tinted | Tinted | Clear |
| Glass thickness, mm. | 10 | 5.5– 6.4 | 5.5– 6.4 | 4.8 | 19 |
| Defects: |  |  |  |  |  |
| Stones, knots, bubbles & blisters per square meter | 0.076 | 0.037 | 0.068 | 0.025 | 0.38 |
| Bubbles per square meter | 0.051 | 0.027 | 0.009 | 0.002 | 0.19 |
| Seeds per square meter | 3.65 | 2.63 | 2.40 | 0.60 | 9.1 |

*Typical prior art practice.

In Table I a number of batch formulae are shown which illustrate the present invention alongside a typical prior art formula. Example 1 is a batch formula typical of commercial flat glass practice prior to this invention, and which previously would have been considered to have a relatively low salt cake content. Example 2 shows a marginally acceptable set of operating conditions with the ratio of $SO_3$ added to $SO_3$ retained slightly higher than that found to be most advantageous. Examples 3 through 5 are illustrative embodiments of the present invention wherein the sulfur content (calculated as $SO_3$) in the raw materials is less than 2.25 times the $SO_3$ retained in the glass leaving the melting furnace, more specifically, the ratios in Examples 3 and 4 are in the preferred range of less than 2.0. From the data in the table, it can be seen that the operations in Examples 3 through 5 resulted in reduced sulfur-containing emissions, and that, unexpectedly, the reductions in emissions were proportionately greater than the reductions in salt cake. Additionally, the Table shows that defect densities were not detrimentally affected, but were maintained within the high standards for flat glass. But perhaps most significantly, the production runs represented by Examples 3, 4 and 5 were at advantageously high batch-to-cullet ratios of 70/30, 90/10, and 100/0 respectively, which in accordance with prior art practice would have entailed increased emissions rather than the reduction achieved by the present invention. Examples 3, 4, and 5 presented no foam problems.

A furnace employing the batch of Example 1 was found to exceed applicable state standards for particulate emissions, and the operation of Example 2 was marginally out of compliance, whereas Examples 3, 4, and 5 were well within the standards. Maximum allowable particulate emissions are calculated differently in different jurisdictions; the standard to which the examples were subjected was calculated by the following formula:

$$e_{max} = 4.1p^{0.67}$$

where:
$e_{max}$ = maximum allowable particulate emissions, kg./hour
p = process weight input (total feed to the furnace up to 27.3 metric tons per hour), 2000 kg./hour It should be understood that the sulfur content of the batch, cullet, glass produced, and emissions in Table I have been expressed as $SO_3$ for the sake of convenience. The sulfur in the cullet and product glass are analyzed as $SO_3$, but the $SO_3$ content of batch is usually provided by salt cake, but could also be supplied by other sources such as gypsum, barytes, or $SO_2$ gas as in U.S. Pat. No. 3,375,095. The emissions may include primarily $Na_2SO_4$ particles, $H_2SO_4$ mist, and small amounts of $SO_2$ and possibly some $SO_3$. What constitutes particulate emissions under governmental air pollution standards depends upon the method of sampling the effluent gas. One type involves filtering particles from the effluent stream, dissolving the contents of the filter in water, and then analyzing the solution. When such a type of sampling is employed, it has been found that, prior to this invention, particulate emissions were usually about 75% by weight sulfur compounds; when operating in accordance with the present invention, sulfur compounds have been found to constitute only about one-third by weight of the particulate emissions. An empirically derived relationship between total particulate emissions and the calculated value for $SO_3$ lost, as reported in Table I, has been found to be:

$$x = 0.196y + 1.083$$

where:

through 9 include coal in the batch while Example 10 is free of coal; all show improved emissions at high batch-to-cullet ratios.

TABLE II

|  | Example 6 | Example 7 | Example 8 | Example 9 | Example 10 |
|---|---|---|---|---|---|
| Glass type | Clear | Clear | Clear | Clear | Clear |
| Coal, parts by weight per 1000 parts by weight sand | 0.96 | 0.53 | 0.93 | 0.97 | 0 |
| Salt cake, parts by weight per 1000 parts by weight sand | 14 | 14 | 15 | 15 | 12 |
| Batch/cullet weight ratio | 73/27 | 73/27 | 73/27 | 72/28 | 80/20 |
| $SO_3$ retained in glass, weight percent | 0.27 | 0.27 | 0.27 | 0.27 | 0.25 |
| $SO_3$ in batch + cullet, kg./2000 kg. glass | 9.56 | 9.56 | 10.12 | 10.05 | 8.68 |
| $SO_3$ lost, kg./2000 kg. glass | 4.16 | 4.16 | 4.72 | 4.65 | 3.68 |
| $SO_3$ added/$SO_3$ retained ratio | 1.77 | 1.77 | 1.87 | 1.86 | 1.74 | x = total particulate emissions, kg./1000 kg. glass produced
y = $SO_3$ lost, kg./1000 kg. glass produced The amount of $SO_3$ in the batch and cullet may be calculated by the following formula:

$$S = (0.673YB + 20ZC)/(0.825B + C)$$

where:
S is kilograms of $SO_3$ per 2000 kg. glass produced.
B is the fraction of batch in the feed.
C is the fraction of cullet in the feed.
Y is the kilograms of salt cake per 1000 kg. sand in the batch.
Z is weight percent $SO_3$ in the cullet.

The concentration of $SO_3$ in the final glass product will vary slightly in accordance with the glass composition, the furnace temperature, and the amount of salt cake used. Flat glass typically includes about 0.15 to 0.50 percent by weight $SO_3$. The glasses produced in Examples 1 through 5 may have undergone maximum fluctuations in their $SO_3$ contents from about 0.20 to about 0.30 percent by weight, but in calculating the amount of $SO_3$ retained in each glass, an approximate average of 0.25 percent by weight $SO_3$ was assumed.

The ratio of $SO_3$ added to $SO_3$ retained must logically be no less than 1.0, but because some volatilization of $SO_3$ is necessary for fining of the glass, the ratio should be at least slightly greater than 1.0. It has been estimated that a minimal fining effect for flat glass entails the volatilization of about one-half part by weight $SO_3$ for each 1000 parts by weight of glass produced. If, for example, 0.25 percent by weight $SO_3$ is retained in the glass, the approximate minimum ratio of $SO_3$ added to $SO_3$ retained would be about 1.2.

The present invention permits the inclusion of coal (carbon) in the batch, but it has been found preferable to minimize or essentially exclude coal in order to attain the lowest emission levels. The essential exclusion of coal is intended to mean that the batch is free of any deliberate addition of coal, but does not exclude trace amounts which may be present as impurities. In some cases, such as with glasses colored with iron, it may be necessary to include some coal to maintain a certain oxidation state in the melt. In such cases, a minimal inclusion of coal would be an amount sufficient to maintain a maximum ferrous/total iron ratio of about 0.35 for clear glass or about 0.30 for tinted glass. The amount of coal that this represents depends upon the particular operating conditions in a specific furnace. In Table II, Examples 6 through 10 each show the operation of a different large scale, continuous, flat glass melting furnace within the scope of the invention. Examples 6

I claim:

1. In the continuous, large-scale method of melting soda-lime-silica glass wherein a pool of molten glass is maintained within an elongated furnace, and raw, unmelted glass batch materials and cullet, in a batch/cullet weight ratio of 70/30 to 100/0, are fed into the furnace at one end and melted glass is withdrawn at the opposite end and formed into a flat glass ribbon, wherein sources of Si, Na, K, Ca, Mg, Al, and Fe in the batch and cullet are proportioned to yield a final glass composition comprising, by weight:

69–75 percent $SiO_2$
12–16 percent $Na_2O$
0–2 percent $K_2O$
8–12 percent $CaO$
2–5 percent $MgO$
0–2 percent $Al_2O_3$
0–0.7 percent $Fe_2O_3$ and the interior of the furnace is maintained at sufficient temperatures and conditions to melt and react the batch and cullet to yield said glass composition, wherein the batch and cullet also include sources of sulfur, a portion of which is retained in the glass and additionally comprises 0.15 percent to 0.5 percent by weight of final glass composition as $SO_3$ and the remainder of which is volatilized and escapes from the pool of molten glass as gaseous products of reaction, said volatilization and escape of part of the sulfur serving as essentially the sole fining agent to reduce gaseous inclusions in the glass, said sulfur sources being provided in an amount and conditions being maintained in the furnace to induce sufficient volatilization of sulfur to fine the glass to a seed count of no more than one seed per square foot of formed glass ribbon, the improvement comprising:

maintaining the input rate of sulfur from the batch and cullet being fed into the furnace at 1.20 to 2.25 times the weight of sulfur being withdrawn in the final glass composition, whereby sulfur-containing emissions from the furnace are minimized while maintaining sufficient fining action.

2. The method of claim 1 wherein the amount of sulfur in the input stream of batch and cullet is no more than 2 times the weight content of sulfur in the glass being withdrawn from the furnace.

3. The method of claim 2 wherein the feed stream is essentially free of carbon.

4. The method of claim 3 wherein the source of $SO_3$ consists essentially of salt cake or gypsum and the $SO_3$ content of the cullet.

5. The method of cliam 4 wherein the batch ingredients include sand, soda ash, limestone, and dolomite.

6. The method of claim 1 wherein the weight ratio of batch-to-cullet is at least 80/20.

7. The method of claim 1 wherein the feed stream is essentially free of carbon.

8. The method of claim 1 wherein the feed stream includes iron oxide and sufficient carbon to yield a ferrous/total iron ratio in the glass no greater than 0.35.

9. The method of claim 1 wherein the feed stream includes iron oxide and sufficient carbon to yield a ferrous/total iron ratio in the glass no greater than 0.30.

10. The method of claim 1 wherein the amount of sulfur in the input stream of batch and cullet is at least 1.2 times but no greater than 2.0 times the weight of sulfur in the glass being withdrawn from the furnace.

11. The method of claim 10 wherein the $SO_3$ content of the glass being withdrawn from the furnace is about 0.20 percent by weight to about 0.3 percent by weight.

12. The method of claim 1 wherein the source of $SO_3$ consists essentially of salt cake or gypsum and the $SO_3$ content of the cullet.

* * * * *

UNITED STATES PATENT AND TRADEMARK OFFICE
CERTIFICATE OF CORRECTION

PATENT NO. : 4,138,235
DATED : February 6, 1979
INVENTOR(S) : Warren H. Turner

It is certified that error appears in the above-identified patent and that said Letters Patent are hereby corrected as shown below:

In col. 7, line 16, in the definition of the term "x" "kg./1000 kg." should read --kg./2000 kg.--; and on line 18, in the definition of the term "y" "kg./1000 kg." should read --kg./2000 kg.--.

Signed and Sealed this

Seventeenth Day of November 1981

[SEAL]

Attest:

Attesting Officer

GERALD J. MOSSINGHOFF

Commissioner of Patents and Trademarks